Jan. 12, 1960 J. W. HURLEY 2,920,687
COLLAPSIBLE AUTOMOBILE SEAT
Filed Oct. 23, 1956
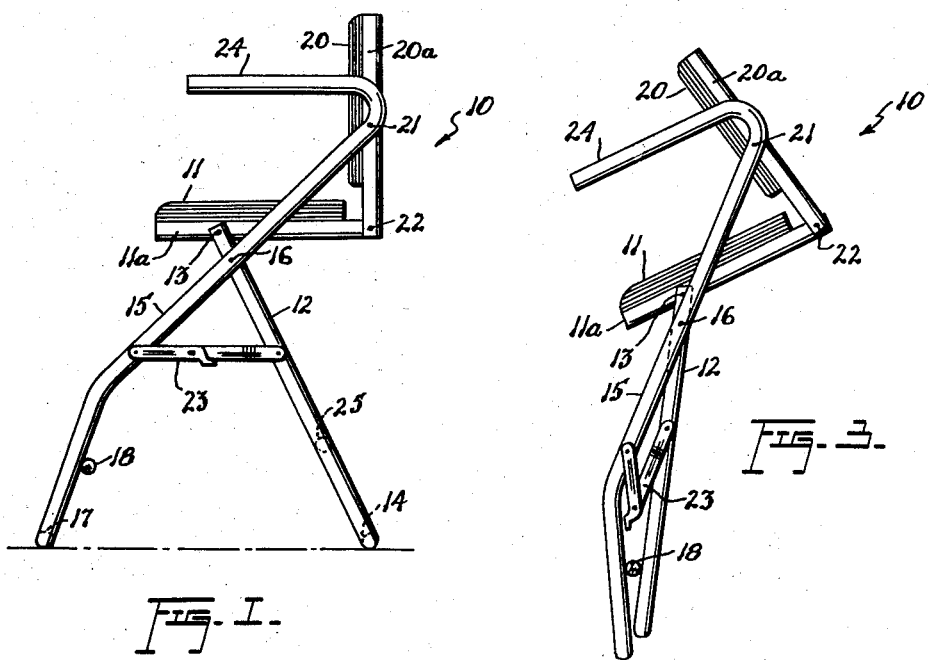
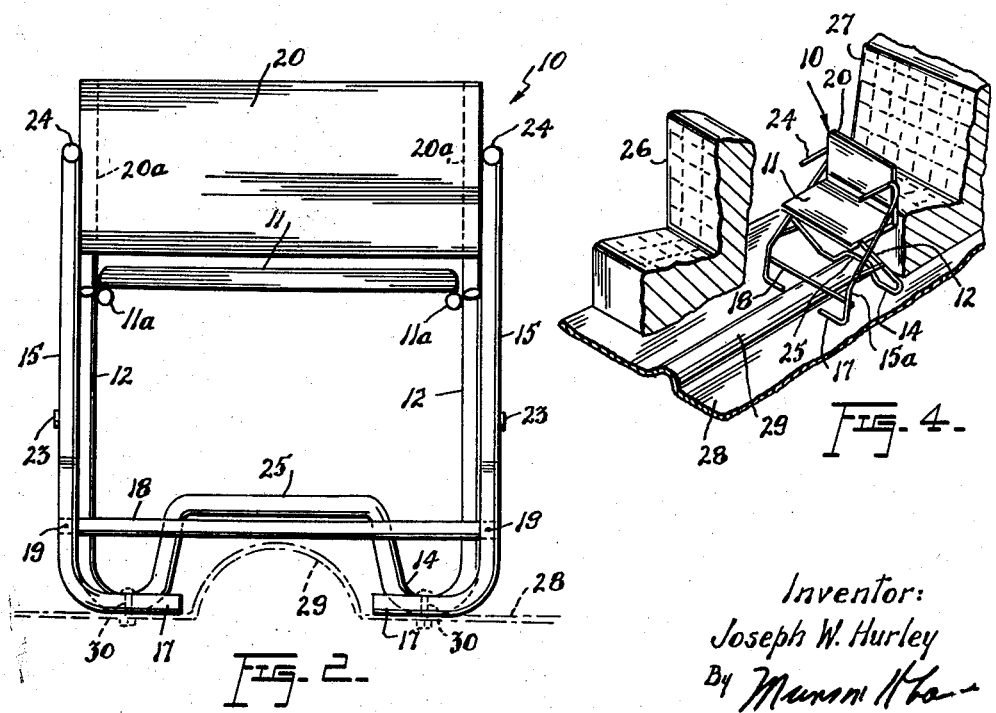
Inventor:
Joseph W. Hurley
By Munson Ma
Atty.

United States Patent Office 2,920,687
Patented Jan. 12, 1960

2,920,687

COLLAPSIBLE AUTOMOBILE SEAT

Joseph W. Hurley, Dallas, Tex.

Application October 23, 1956, Serial No. 617,801

1 Claim. (Cl. 155—147)

This invention relates to new and useful improvements in automobile seats, and the principal object of the invention is to facilitate safe and comfortable travelling of children in automobiles and similar vehicles.

As is well known, driving conditions often require quick starts, stops or turns to be made and when children, particularly small children, occupy the conventional seats of the automobile, they frequently sustain injury by being thrown against some portion of the vehicle when such quick starts, stops or turns occur. Also, while occupying the conventional seats, the children are free to move about and to stand up, with similar injurious results.

The present invention eliminates these dangerous conditions by providing a special seat, adapted to be installed centrally between the conventional front and rear seats of an automobile, so that a child seated therein is safely and comfortably confined, without the possibility of being thrown about by sudden movements of the vehicle.

If desired, the seat in accordance with the invention may be firmly secured to the floor of the automobile, and the close proximity of the automobile front seat to the front of the special seat prevents the child from falling forwardly. In addition, a belt or strap may be used on the special seat to retain the child in place.

By virtue of its central location on the automobile floor, the child's seat is in a position wherein the child may comfortably see in all directions, so that the usual tendency of the child to shift from one side of the automobile to the other for purposes of outside viewing is discouraged.

Automobiles are usually provided in the floor thereof with an upwardly projecting drive shaft tunnel extending along the longitudinal center line of the car. The instant seat is adapted to be disposed above this tunnel and an important feature of the invention resides in arranging the leg members of the special seat in such manner that they rest on the floor at opposite sides of the tunnel and provide clearance for the same so that the presence of the tunnel is not detrimental to proper positioning of the seat.

Another important feature of the invention resides in its collapsible construction, which permits the seat to be easily folded and stored away in compact form when it is not in use.

Some of the advantages of the invention reside in its simplicity, in its dependability and in its adaptability to economical manufacture.

With the foregoing more important objects and features in view and such other objects and features as may become apparent as this specification proceeds, the invention will be understood from the following description taken in conjunction with the accompanying drawing, wherein like characters of reference are used to designate like parts, and wherein:

Figure 1 is a side elevational view of a seat in accordance with the invention, the same being shown in its erected form;

Figure 2 is a front elevational view thereof;

Figure 3 is a side elevational view of the seat in its collapsed position; and

Figure 4 is a fragmentary perspective view showing the interior of an automobile with the special seat disposed between the front and rear seats thereof.

Referring now to the accompanying drawing in detail, the collapsible seat is designated generally by the reference numeral 10 and embodies in its construction a seat panel 11 which is suitably padded in accordance with conventional practice and is provided at the opposite ends or sides thereof with a pair of tubular supporting bars 11a which, for purposes of convenient reference may be regarded as components of the seat panel proper.

A pair of tubular rear leg members 12 are connected at their upper ends by suitable pivots 13 to the bars 11a of the seat panel, while the lower ends of these members are connected together with an integral cross member 14, hereinafter more fully described.

A pair of tubular side pieces 15 are provided intermediate their ends with pivots 16 whereby they are fastened to the rear leg members 12 adjacent the pivots 13, the lower end portions of these side pieces providing a pair of front leg members 15a which terminate at their lower ends in a pair of inturned feet 17. The opposing inner ends of the feet 17 are spaced apart as shown in Figure 2, and the leg members 15a are connected together by a cross piece 18 which is secured thereto by suitable fastening elements 19. The cross piece 18 is spaced upwardly from the feet 17, as shown.

The side pieces 15 are connected by the pivots 16 to the rear leg members 12 in crossed relation and a back rest 20 is connected to the upper end portions of the side pieces by suitable pivots 21. Like the seat panel 11, the back rest is suitably padded and is provided at the opposite ends or sides thereof with a pair of tubular supporting bars 20a which may be regarded as components of the back rest proper.

The aforementioned pivots 21 are fastened to the bars 20a of the back rest and the lower ends of the bars 20a are attached by suitable pivots 22 to the rear ends of the bars 11a of the seat panel 11. By virtue of this arrangement, the seat may be folded from its erected position shown in Figure 1 to its collapsed position shown in Figure 3, wherein it may be easily stored in a compact form when it is not in use.

A pair of collapsible struts 23 of any conventional type extend between the front and rear leg members 15a, 12, respectively, and lock the same in a fixed angular relation when the seat is in its erected position, thus preventing the same from collapsing until the struts are manually unlocked.

Integral continuations of the upper ends of the side pieces 15 are angulated forwardly to provide a pair of arm rests 24 at the sides of the seat panel and back rest, and if desired, a suitable belt or strap (not shown) may be extended between the front end portions of these arm rests to retain a child in the seat.

With reference now to the aforementioned cross member 14 connecting the rear leg members 12, the same is provided wtih an upwardly offset intermediate portion 25 which affords thereunder a space in front and rear alignment with the space between the inner ends of the feet 17, the offset portion 25 being substantially at the level of the cross piece 18.

Figure 4 illustrates the interior of an automobile including a front seat 26, a rear seat 27 and a floor 28 provided with an upwardly projecting, centrally disposed drive shaft tunnel 29. The child's seat 10 is intended to be positioned between the front seat 26 and the rear seat 27, directly over the tunnel 29, the seat 10 thus being centrally located in the vehicle so as to permit the child to see comfortably in all directions.

The feet 17 of the front leg members 15a rest on the floor 28 at opposite sides of the tunnel 29, with the latter being accommodated in the space between the inner ends of the feet and the cross piece 18 extending transversely above the tunnel while providing sufficient clearance therefor. Similarly, the offset portion 25 of the cross member 14 provides clearance for the tunnel while the end portions of the cross member at the lower ends of the rear leg members 12 rest on the floor at opposite sides of the tunnel. Thus, the presence of the tunnel does not interfere with proper positioning of the seat 10 on the floor 28, and if desired, the seat may be rigidly secured to the floor by suitable fastening elements as indicated at 30. It is to be noted that when the seat 10 is installed the front thereof is disposed in close proximity to the back of the front seat 26, so that the child is prevented from falling forwardly from the seat if no retaining belt or strap is used.

Although the seat 10 as herein disclosed is of a collapsible form, a rigid seat, permanently installed in the vehicle may also be provided.

While in the foregoing there has been described and shown the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claim.

What is claimed as new is:

A collapsible seat, comprising in combination, a rectangular seat panel having front and rear edges and a pair of side edges, a pair of forwardly inclined rear leg members pivoted at their upper ends to the side edges of said seat panel adjacent the front edge of the latter, a cross member connecting together the lower ends of said rear leg members and having an inverted U-shaped intermediate portion of a substantial height whereby to provide a substantial clearance under the bight region of said U-shaped intermediate portion for accommodating upward protuberances on a supporting surface on which the seat may be positioned, a pair of side pieces pivoted intermediate their ends to upper end portions of said rear leg members in a rearwardly inclined crossing relation therewith, the lower end portions of said side pieces constituting a pair of front leg members, a pair of inturned feet provided at the lower ends of said front leg members and having spaced apart inner ends affording a clearance therebetween corresponding substantially to the width of said U-shaped intermediate portion of said cross member, a rectangular back rest including a pair of side bars pivoted at their lower ends to the side edges of said seat panel adjacent the rear edge thereof, upper end portions of said side pieces being pivoted to intermediate portions of said side bars, forwardly projecting extensions provided at the upper ends of said side pieces in upwardly spaced parallel relation to said seat panel and constituting a pair of arm rests, and a pair of collapsible braces pivoted to the front and rear leg members.

References Cited in the file of this patent

UNITED STATES PATENTS

| 807,587 | Wagner | Dec. 19, 1905 |
| 1,380,678 | Price | June 7, 1921 |
| 1,975,062 | Johannsen | Sept. 25, 1934 |
| 2,517,004 | Little et al. | Aug. 1, 1950 |
| 2,540,823 | Heller | Feb. 6, 1951 |
| 2,699,817 | Adler et al. | Jan. 18, 1955 |
| 2,719,573 | Lesser | Oct. 4, 1955 |
| 2,757,716 | Moore et al. | Aug. 7, 1956 |

FOREIGN PATENTS

| 966,351 | France | Mar. 1, 1950 |